US010673949B2

(12) United States Patent
Varick

(10) Patent No.: US 10,673,949 B2
(45) Date of Patent: Jun. 2, 2020

(54) VEHICLE SAFETY AND MOBILITY ALERT SYSTEM

(71) Applicant: BrandMotion, LLC, Southfield, MI (US)

(72) Inventor: John F. Varick, Ann Arbor, MI (US)

(73) Assignee: BrandMotion, LLC, Southfield, MI (US)

( * ) Notice: Subject to any disclaimer, the term of this patent is extended or adjusted under 35 U.S.C. 154(b) by 0 days.

(21) Appl. No.: 15/419,795

(22) Filed: Jan. 30, 2017

(65) Prior Publication Data

US 2017/0221356 A1 Aug. 3, 2017

Related U.S. Application Data

(60) Provisional application No. 62/288,666, filed on Jan. 29, 2016, provisional application No. 62/452,199, filed on Jan. 30, 2017.

(51) Int. Cl.
*H04L 29/08* (2006.01)
*G08G 1/0967* (2006.01)

(52) U.S. Cl.
CPC ....... *H04L 67/12* (2013.01); *G08G 1/096716* (2013.01); *G08G 1/096758* (2013.01); *G08G 1/096783* (2013.01); *G08G 1/096791* (2013.01)

(58) Field of Classification Search
CPC .............................. G08G 1/0962; H04L 67/12

USPC ......................................................... 340/901
See application file for complete search history.

(56) References Cited

U.S. PATENT DOCUMENTS

| 2002/0117522 | A1* | 8/2002 | Murphy | B60R 1/12 224/277 |
| 2007/0171037 | A1* | 7/2007 | Schofield | B60C 23/00 340/438 |
| 2010/0198513 | A1* | 8/2010 | Zeng | B60W 40/02 701/300 |
| 2011/0080481 | A1 | 4/2011 | Bellingham | |
| 2015/0060617 | A1* | 3/2015 | Pan | B60R 11/02 248/227.1 |

* cited by examiner

*Primary Examiner* — Omer S Khan
(74) *Attorney, Agent, or Firm* — Great Lakes Intellectual Property, PLLC

(57) ABSTRACT

A vehicle safety and mobility alert system is contemplated. The system may be configured to facilitate wirelessly exchanging basic safety messages (BSMs) and the like with a connected vehicle network operable to communicate with vehicles, signage and other devices connected thereto. An onboard unit (OBU) of the vehicle may be configured to process the BSMs and correspondingly generate safety notifications for one or more occupants of the vehicle. An advanced driver assisted system (ADAS) may be configured to communicate information associated with the safety notifications through sensory alerts generated with one or more indicators positioned relative to a mirror or an A-frame of the vehicle.

11 Claims, 2 Drawing Sheets

VEHICLE SAFETY AND MOBILITY ALERT SYSTEM

CROSS-REFERENCE TO RELATED APPLICATIONS

This application claims the benefit of U.S. provisional Application No. 62/288,666 filed Jan. 29, 2016 and of U.S. provisional Application No. 62/452,199 filed Jan. 30, 2017, the disclosure of which are incorporated in their entireties by reference herein.

TECHNICAL FIELD

One non-limiting aspect of the present invention relate to providing the transportation industry a solution for new safety and mobility features and functions, which may be made available to a wide spectrum of vehicles produced before and after original vehicle manufacture.

BACKGROUND

More and more vehicles are being manufactured to include capabilities to facilitate wireless communication with other vehicles, signage and objects, etc. external to the vehicle. One non-limiting aspect of the present invention contemplates facilitating use of such communication capabilities to provide a vehicle safety and mobility alert system to occupants when the vehicle is in motion.

BRIEF DESCRIPTION OF THE DRAWINGS

FIGS. 3-14 illustrates embodiments of an advanced driver assistance system (ADAS) of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
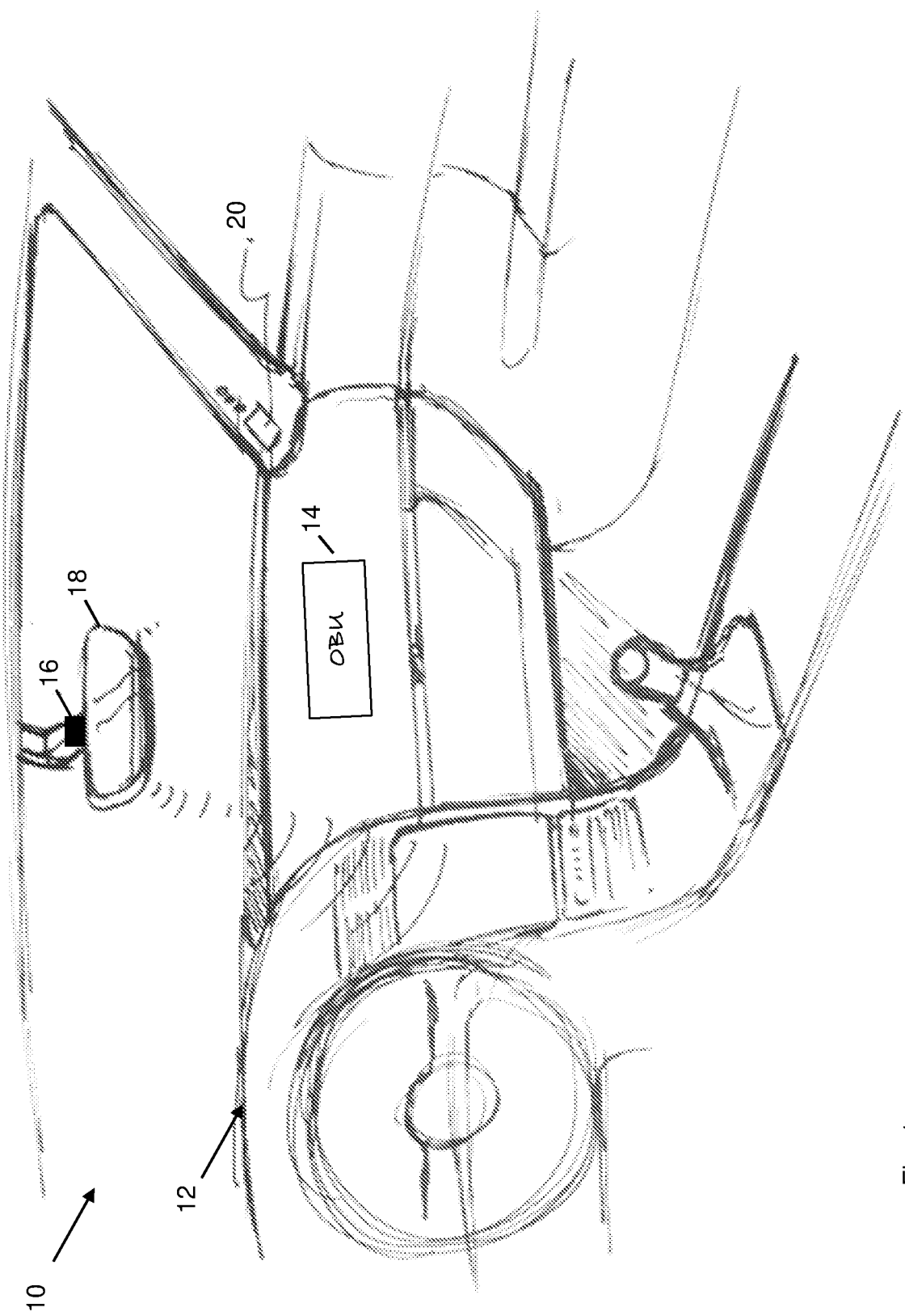
FIG. 1 illustrates a vehicle safety and mobility alert system in accordance with one non-limiting aspect of the present invention.

FIG. 1 illustrates a safety and mobility alert system 10 for a vehicle 12 in accordance with one non-limiting aspect of the present invention. The system 10 may be configured to facilitate wirelessly exchanging basic safety messages (BSMs) and the like with a connected vehicle network (not shown) operable to communicate with vehicles, signage and other devices connected thereto (not shown). An onboard unit (OBU) 14 of the vehicle may be configured to process the BSMs and correspondingly generate safety notifications for one or more occupants of the vehicle 12. A first advanced driver assisted system (ADAS) 16 may be configured to communicate information associated with the safety notifications through sensory alerts generated with one or more indicators position relative to a mirror 18 mounted to a windshield. A second ADAS 20 connected to an A-frame of the vehicle 12 may operate similarly and/or in conjunction with the first ADAS 16.

Figure 2:
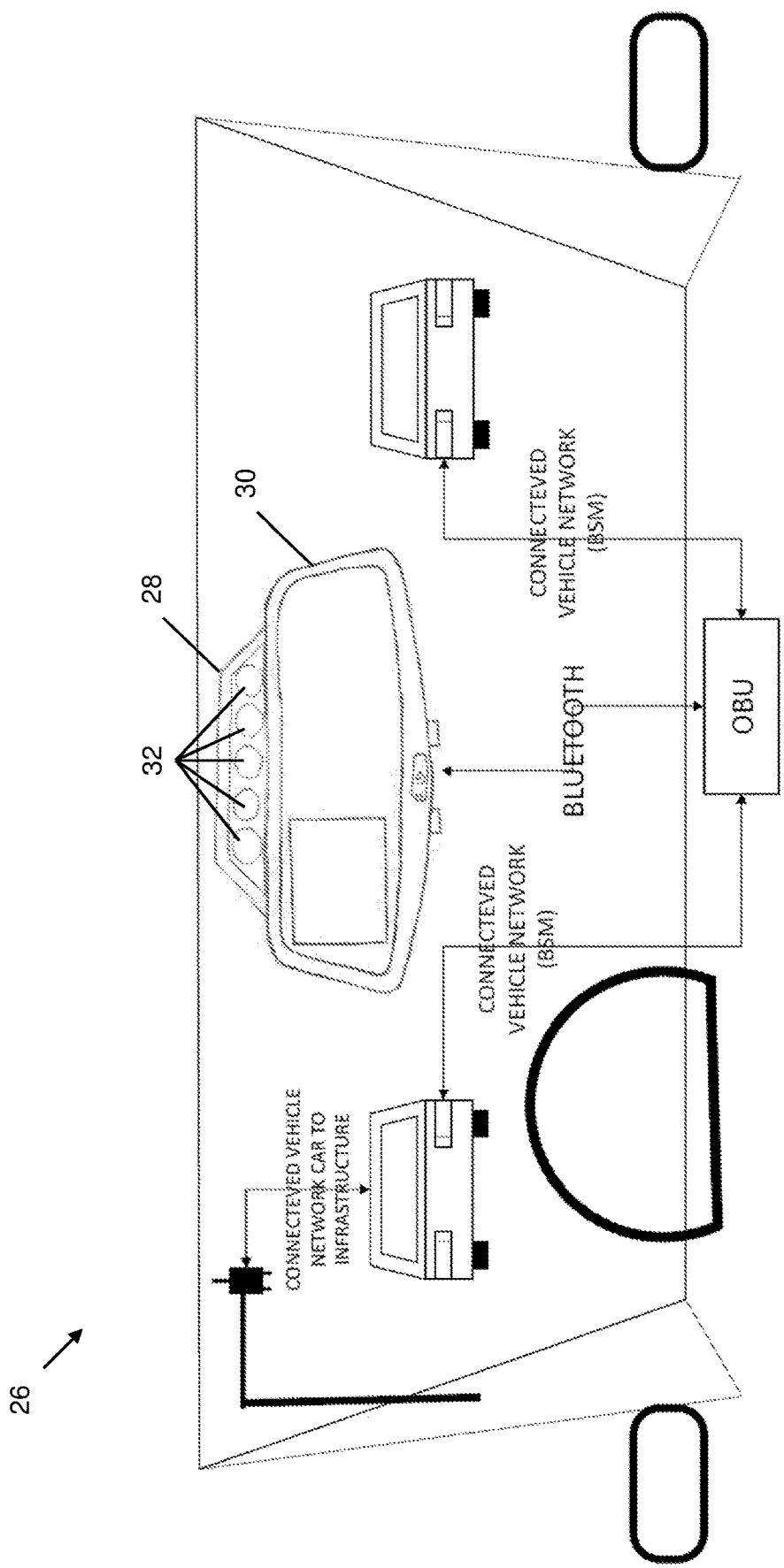
FIG. 2 illustrates a vehicle safety and mobility alert system in accordance with one non-limiting aspect of the present invention.

FIG. 2 illustrates a safety and mobility alert system 26 for a vehicle in accordance with one non-limiting aspect of the present invention. The system 26 may be configured to facilitate wirelessly exchanging basic safety messages (BSMs) and the like with a connected vehicle network operable to communicate with vehicles, signage and other devices connected thereto. An onboard unit (OBU) of the vehicle may be configured to process the BSMs and correspondingly generate safety notifications for one or more occupants of the vehicle. A advanced driver assisted system (ADAS) may be included within a housing removably affixed to a mirror 30 and configured to communicate information associated with the safety notifications through sensory alerts generated with one or more indicators 32 position relative to the mirror 30. The OBU is shown to communicate with the ADAS via Bluetooth for exemplary non-limiting purposes as any suitable wireless and/or wired communication may be used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A safety and mobility alert system for a vehicle comprising:
    an onboard unit (OBU) configured to wirelessly communicate with a connected vehicle network to facilitate exchange of a plurality of basic safety messages (BSMs) with a plurality of vehicles, devices or signage wirelessly in communication therewith, the OBU generating a plurality of safety notifications for one or more occupants of the vehicle as a function the plurality of BSMs;
    an advanced driver assistance system (ADAS) configured to generate a plurality of sensory alerts sufficient for interfacing the plurality of safety notifications with the one or more occupants, the ADAS including a plurality of indicators to facilitate interfacing at least some of the plurality of sensory alerts;
    wherein the ADAS includes a housing shaped to be removably attached to a mirror of the vehicle, the mirror being affixed to a windshield of the vehicle via a mirror stem, the housing being shaped to position the plurality of indicators proximate an edge of the mirror corresponding with a bezel extending circumferentially around a reflective portion of the mirror, the housing including a clip for removably attaching to the mirror stem and a hook part for removably attaching to the bezel;
    wherein the clip includes a channel leading to an opening, the channel being narrower than the opening to journal the mirror stem within the opening when attached to the mirror;
    wherein the hook part is generally L-shaped such that the hook part settles against at least a top side and a front side of the bezel when the housing is attached to the mirror, wherein a bottom side of the bezel is closest to the reflective portion opposite to the top side; and wherein the plurality of indicators are positioned within a portion of the housing outboard of the hook part.

2. The system of claim 1 wherein the ADAS includes a non-transitory computer-readable medium having a plurality of instructions stored thereon and executable with a processor included within the housing to facilitate processing the plurality of safety notifications and correspondingly controlling information conveyed with the plurality of indicators as a function thereof.

3. The system of claim 2 wherein the plurality of sensory alerts include visual, sound or tactile sensations.

4. The system of claim 2 wherein the OBU includes a non-transitory computer-readable medium having a plurality of instructions stored thereon and executable with a processor associated therewith to facilitate processing the plurality of BSMs and correspondingly generating the plurality of safety notifications as a function thereof.

5. The system of claim 2 wherein the OBU wirelessly communicates the plurality of safety notifications to the ADAS.

6. The system of claim 1 wherein the housing is shaped to include a cut out within a perimeter of the opening for one or more cables of the ADAS to pass through.

7. The system of claim 1 wherein the channel and the opening cooperate to define a keyhole shape.

8. The system of claim 1 wherein the circular opening settles against the mirror stem when the mirror stem is journaled therein.

9. The system of claim 1 wherein the second width is slightly larger than a third width of the mirror stem.

10. The system of claim 1 wherein the housing includes at least a first part separable from a second part to facilitate attachment to the mirror, the first part including the clip and the second part including the hook part.

11. A safety and mobility alert system for a vehicle having an onboard unit (OBU) to wirelessly communicate with a connected vehicle network to facilitate exchange of a plurality of basic safety messages (BSMs) with a plurality of vehicles, devices or signage wirelessly in communication therewith, the OBU generating a plurality of safety notifications for one or more occupants of the vehicle as a function the plurality of BSMs, the system comprising:

an advanced driver assistance system (ADAS) configured to generate a plurality of sensory alerts sufficient for interfacing the plurality of safety notifications with the one or more occupants, the ADAS including a plurality of indicators to facilitate interfacing at least some of the plurality of sensory alerts;

wherein the ADAS includes a housing shaped to be removably attached to a mirror of the vehicle, the mirror being affixed to a windshield of the vehicle via a mirror stem, the housing being shaped to position the plurality of indicators proximate an edge of the mirror corresponding with a bezel extending circumferentially around a reflective portion of the mirror, the housing including a clip for removably attaching to the mirror stem and a hook part for removably attaching to the bezel;

wherein the clip includes a channel leading to an opening, the channel being narrower than the opening to journal the mirror stem within the opening when attached to the mirror;

wherein the hook part is generally L-shaped such that the hook part settles against at least a top side and a front side of the bezel when the housing is attached to the mirror, wherein a bottom side of the bezel is closest to the reflective portion opposite to the top side; and wherein the plurality of indicators are positioned within a portion of the housing outboard of the hook part.

* * * * *